(12) United States Patent
Yoshida et al.

(10) Patent No.: US 7,268,995 B2
(45) Date of Patent: Sep. 11, 2007

(54) ELECTRIC DOUBLE LAYER CAPACITOR

(75) Inventors: Hiroshi Yoshida, Chiba (JP); Kanako Yuyama, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 11/525,968

(22) Filed: Sep. 25, 2006

(65) Prior Publication Data

US 2007/0070580 A1 Mar. 29, 2007

(30) Foreign Application Priority Data

Sep. 26, 2005 (JP) ............................. 2005-277475

(51) Int. Cl.
*H01G 9/00* (2006.01)
(52) U.S. Cl. ................... 361/502; 361/504; 361/508; 361/512; 361/516; 361/518; 29/25.01; 29/25.03
(58) Field of Classification Search ............... 361/502, 361/503, 504, 508–512, 516–519, 523–528; 29/25.01, 25.03; 252/62.2
See application file for complete search history.

(56) References Cited

U.S. PATENT DOCUMENTS

| | | | | |
|---|---|---|---|---|
| 5,706,165 | A * | 1/1998 | Saito et al. | 361/502 |
| 5,973,912 | A * | 10/1999 | Kibi et al. | 361/502 |
| 6,414,837 | B1 * | 7/2002 | Sato et al. | 361/504 |
| 6,459,564 | B1 | 10/2002 | Watanabe et al. | |
| 6,602,742 | B2 * | 8/2003 | Maletin et al. | 438/142 |
| 6,862,168 | B2 * | 3/2005 | Ando et al. | 361/504 |
| 6,955,694 | B2 * | 10/2005 | Bendale et al. | 29/25.03 |
| 2003/0169557 | A1 | 9/2003 | Noguchi et al. | |

FOREIGN PATENT DOCUMENTS

| JP | 11-54375 A | 2/1999 |
|---|---|---|
| JP | 3008399 B2 | 2/2000 |
| JP | 2000-286161 A | 10/2000 |
| JP | 2001-196273 A | 7/2001 |

(Continued)

OTHER PUBLICATIONS

J.C. P. Broekhoff et al.; "X. Calculations of Pore Distributions from the Adsorption Branch of Nitrogen Sorption Isotherms in the Case of Open Cylindrical Pores" Journal of Catalysis, vol. 9, pp. 15-27 (1967).

(Continued)

*Primary Examiner*—Nguyen T. Ha
(74) *Attorney, Agent, or Firm*—Westerman, Hattori, Daniels & Adrian, LLP.

(57) ABSTRACT

An electric double layer capacitor is composed of a pair of current collectors, a positive polarizable electrode provided on one of the pair of current collectors, a negative polarizable electrode provided on the other of the pair of current collectors, a separator between the positive and negative polarizable electrodes, and an organic electrolytic solution which impregnates at least the positive and negative polarizable electrodes and the separator. The capacitor has a theoretical amount of ions $Q_t$ defined as $$Q_t \text{ (moles)} = C \times V \div 96,500,$$

wherein C is the rated capacitance (farads) of the capacitor and V is the rated voltage (volts), and an amount of ions $Q_e$ in the organic electrolytic solution, such that $Q_e/Q_t = 1.7$ to 3.5. The capacitor has a high voltage rating, excellent cycle characteristics during high-current charging and discharging, and a low internal resistance in low-temperature environments.

7 Claims, 2 Drawing Sheets

FOREIGN PATENT DOCUMENTS

| | | |
|---|---|---|
| JP | 2002-93663 A | 3/2002 |
| JP | 3389353 B2 | 3/2003 |
| JP | 2003-257793 A | 9/2003 |
| JP | 2004-253562 A | 9/2004 |
| JP | 2005-45180 A | 2/2005 |

OTHER PUBLICATIONS

R. SH. Mikhail et al.; "Investigations of a Complete Pore Structure Analysis" Journal of Colloid and Interface Science, vol. 26, pp. 45-53, (1968).

* cited by examiner

FIG.1

ELECTRIC DOUBLE LAYER CAPACITOR

CROSS-REFERENCE TO RELATED APPLICATION

This non-provisional application claims priority under 35 U.S.C. §119(a) on Patent Application No. 2005-277475 filed in Japan on Sep. 26, 2005, the entire contents of which are hereby incorporated by reference.

BACKGROUND OF THE INVENTION

1. Field of the Invention

The present invention relates to an electric double layer capacitor.

2. Prior Art

To enhance the characteristics of electric double layer capacitors, the practice until now has been to adjust within a suitable range the volume ratio of the amount of electrolytic solution to the void volume of the polarizable electrodes and the separator.

For example, JP No. 3008399, JP-A 2001-196273, JP-A 2002-93663, JP-A 2004-253562 and JP-A 2005-45180 report that electric double layer capacitors of an excellent durability and temperature characteristics and a low resistance can be obtained by controlling to a suitable value the volume ratio of the amount of electrolytic solution to the void volume of the polarizable electrodes and the separator.

The desirability of adding an excess amount of the electrolytic solution to prevent the electrolytic solution within a capacitor from drying up is clearly recognized in the above-cited art.

Yet, merely optimizing the amount of electrolytic solution in the manner indicated in the above art is not sufficient for achieving an electric double layer capacitor with a higher voltage rating.

In JP-A 2000-286161, which focuses on the relationship between the quantity of electricity charged and the amount of ions in a capacitor, a technique is disclosed for controlling the amount of electrolyte to a level where ions are present only in the vicinity of the electrode surfaces when the capacitor is fully charged. JP No. 3389353 discloses an approach which also takes into consideration the rise in internal resistance; the amount of electrolyte in the electrolytic solution is lowered to a level at which the internal resistance rises, and the electrode filling amount is supplemented to a degree that corresponds to this difference. JP-A 2003-257793 discloses an approach that involves regulating the ion concentration wherein, by adjusting the amount of electrolyte, the electrolytic solution becomes a dielectric at voltage settings above the maximum operating voltage of the capacitor and below the decomposition voltage of the electrolytic solution.

However, in the art described in above JP-A 2000-286161, JP No. 3389353 and JP-A 2003-257793, the aim is to achieve a high capacitance even when the internal resistance is allowed to increase, or to prevent decomposition of the electrolytic solution by making it electrically insulating. Hence, limits are placed on the amount of electrolyte.

Therefore, in such art, the energy density of the electric double layer capacitor is higher, yet the internal resistance rises as the capacitor comes closer to being fully charged. Because this leads to a decrease in the charge-discharge efficiency and a reduction in discharge energy during high-current charging and discharging, the result is a decline in the cycle characteristics. Moreover, lowering the electrolyte concentration may lead to a marked increase in the internal resistance within a low-temperature environment, making charging and discharging impossible to carry out.

SUMMARY OF THE INVENTION

It is therefore an object of the invention to provide an electric double layer capacitor which has a high voltage rating, excellent cycle characteristics during high-current charging and discharging, and a low internal resistance in low-temperature environments.

We have found that, by controlling within a specific range the ratio between the theoretical amount of ions defined in terms of the rated capacitance C (farads) of the capacitor and the rated voltage V (volts), which is the maximum voltage allowed across the capacitor, and the amount of ions within the organic electrolytic solution which impregnates the positive and negative polarizable electrodes and the separator, the voltage rating of the capacitor can be increased without compromising the high-current charge-discharge characteristics and the cycle characteristics of the electric double layer capacitor, in addition to which the capacitor can also be provided with excellent low-temperature characteristics.

Accordingly, the invention provides an electric double layer capacitor having a pair of current collectors, a positive polarizable electrode provided on one of the pair of current collectors, a negative polarizable electrode provided on the other of the pair of current collectors, a separator interposed between the positive and negative polarizable electrodes, and an organic electrolytic solution which impregnates at least the positive and negative polarizable electrodes and the separator. The capacitor has a theoretical amount of ions $Q_t$ defined by formula (I) below $$Q_t \text{ (moles)} = C \times V \div 96{,}500 \qquad (I),$$

wherein C is the rated capacitance (farads) of the capacitor and V is the rated voltage (volts) representing the maximum voltage allowed across the capacitor, and an amount of ions $Q_e$ in the organic electrolytic solution which impregnates the positive and negative polarizable electrodes and the separator, such that the ratio $Q_e/Q_t$ is from 1.7 to 3.5.

In one preferred embodiment, the positive polarizable electrode has a void volume $V_+$ and the negative polarizable electrode has a void volume $V_-$, such that the ratio $V_-/V_+$ is from 1.0 to 2.5.

In another preferred embodiment, the positive polarizable electrode has a void volume $V_+$, the negative polarizable electrode has a void volume $V_-$, and the separator has a void volume $V_s$, such that the ratio $(V_+ + V_-)/V_s$ is from 2.0 to 4.0.

It is preferable for the volume $V_p$ of electrolytic solution which impregnates the void volumes of the positive and negative polarizable electrodes and the separator, and the total volume $V_a$ of the electrolytic solution present in the capacitor to together satisfy the condition that $V_a/V_p$ is from 1.0 to 1.2.

The organic electrolytic solution typically contains 0.9 to 1.8 mol/L of electrolyte, and preferably includes at least an ionic liquid of formula (1) below wherein $R^1$ to $R^4$ are each independently an alkyl group of 1 to 5 carbons or an alkoxyalkyl group of the formula $R'\!-\!O\!-\!(CH_2)_n\!-\!$ ($R'$ being methyl or ethyl, and the letter n being an integer from 1 to 4) and any two of $R^1$, $R^2$, $R^3$ and $R^4$ may form a ring together with X, with the proviso that at least one of $R^1$ to $R^4$ is the alkoxyalkyl group of the above formula; X is a nitrogen atom or a phosphorus atom; and Y is a monovalent anion.

The separator may be composed of glass fibers, polyolefin, polyamideimide or polyester, and have a porosity of 60 to 95%.

The invention makes it possible to obtain an electric double layer capacitor which has a high voltage rating, excellent high-current charge-discharge characteristics and cycle characteristics, and a low internal resistance in low-temperature environments.

Moreover, the electric double layer capacitor of the invention also has an excellent durability under high-voltage application, and excellent charge-discharge properties at low temperatures.

BRIEF DESCRIPTION OF THE DIAGRAMS

DETAILED DESCRIPTION OF THE INVENTION

The electric double layer capacitor of the invention has a pair of current collectors, a positive polarizable electrode provided on one of the pair of current collectors, a negative polarizable electrode provided on the other of the pair of current collectors, a separator interposed between the positive and negative polarizable electrodes, and an organic electrolytic solution which impregnates at least the positive and negative polarizable electrodes and the separator. The capacitor has a theoretical amount of ions $Q_t$ defined by formula (I) below $$Q_t \text{ (moles)} = C \times V \div 96{,}500 \qquad (I),$$

wherein C is the rated capacitance (farads) of the capacitor and V is the rated voltage (volts) of the capacitor representing the maximum voltage allowed across the capacitor, and an amount of ions $Q_e$ in the organic electrolytic solution which impregnates the positive and negative polarizable electrodes and the separator, such that the ratio $Q_e/Q_t$ is from 1.7 to 3.5.

The rated capacitance C (farads) in the invention is calculated from the total amount of energy discharged when, after being constant-current charged to 3.0 V at the one-hour rate current and constant-voltage charged thereafter for 30 minutes, the capacitor was constant-current discharged from 3.0 V to 0 V at the one-hour rate current.

At an ion content ratio $Q_e/Q_t$ below 1.7, the amount of ions $Q_e$ in the organic electrolytic solution is insufficiently large relative to the theoretical amount of ions $Q_t$, resulting in an increase in the internal resistance at low temperatures or a tendency for ion segregation to occur during cyclic charging and discharging at high current, thereby giving rise to temporary decreases in capacitance. On the other hand, at a ratio above 3.5., the amount of ions $Q_e$ in the organic electrolytic solution is too large relative to the theoretical amount of ions $Q_t$, resulting in an increase in the internal resistance at low temperatures and a decrease in durability when a high voltage is applied.

To further improve the high-current charge-discharge characteristics and also to better suppress increases in the internal resistance at low temperatures, the ion content ratio $Q_e/Q_t$ is preferably from 1.7 to 3.2, more preferably from 2.0 to 3.2, and even more preferably from 2.4 to 3.0.

The ion content ratio $Q_e/Q_t$ can be adjusted by: (1) controlling the thickness and electrode densities of the positive and negative polarizable electrodes so as to achieve the desired void volume, (2) selecting a separator of the porosity and thickness that provides the desired void volume, and (3) controlling the electrolyte concentration of the organic electrolytic solution and the amount of the electrolyte solution. A combination of these methods is typically used to control the ion content ratio $Q_e/Q_t$.

The void volumes of the positive and negative polarizable electrodes and of the separator have the same meaning here as the void volumes in JP No. 3008399. That is, the void volume of the separator reflects the somewhat larger size given to the separator than the electrodes in order to prevent short-circuiting. The amount of ions $Q_e$ within the electrolytic solution impregnated into the void volume is calculated from the electrolyte concentration of all the electrolytic solution present in the capacitor as a finished product multiplied by the void volume. This does not take into account, for example, the influence of ion adsorption, such as when the capacitor is in a charged state, or the dumping out of electrolytic solution during production.

The electrical double layer capacitor of the invention is designed with a high capacitance density in order to achieve a high energy density. Moreover, the voltage rating is set to a high value, resulting in a high theoretical amount of ions $Q_t$.

Attempts to achieve a high energy density at this setting will result in a decrease in the void volumes of the positive and negative polarizable electrodes and of the separator. If the electrolyte concentration of the organic electrolytic solution is kept constant, the amount of ions $Q_e$ within the electrolytic solution that is impregnated will decrease. On the other hand, because it is critical that, even under high applied voltage conditions, the capacitor of the invention have such properties as a low internal resistance, good high-current charge-discharge characteristics at low temperature, durability at elevated temperatures and good high-current cycle characteristics, there are limits in the degree to which the amount of ions $Q_e$ may be increased by maintaining a high electrolyte concentration.

Based on the above, fuller explanations of the void volumes of the positive and negative polarizable electrodes and the separator, and on controlling the ion content ratio $Q_e/Q_t$ are provided.

Letting the void volume of the positive polarizable electrode be $V_+$, the void volume of the negative polarizable electrode be $V_-$ and the void volume of the separator be $V_s$, the sum of these three void volumes is equal to the volume $V_p$ of electrolytic solution impregnated into the void volumes of the subsequently described polarizable electrodes and separator.

$$V_p = V_+ + V_- + V_s \qquad (II)$$

Here, if the rated capacitance of the capacitor is kept constant, the separators used are the same, and the number of electrode assemblies stacked is increased, $V_+$ and $V_-$ do not change, but $V_s$ increases with the number of stacked assemblies, resulting in a larger $V_p$.

To control the ion content ratio $Q_e/Q_t$ within the above range, it is desirable for the volume ratio $(V_+ + V_-)/V_s$ to be preferably from 2.0 to 4.0, and more preferably from 2.5 to 3.5.

At below 2.0, the amount of ions $Q_e$ in the organic electrolytic solution impregnated in the void volumes becomes too high relative to the theoretical amount of ions $Q_t$. Conversely, at above 4.0, the amount of ions $Q_e$ relative to the theoretical amount of ions $Q_t$ becomes low. In either of these cases, there arises a possibility of the ion content ratio $Q_e/Q_t$ may fall outside of the above range.

Moreover, in the electric double layer capacitor of the invention, to control the amount of ions in the vicinity of the positive and negative polarizable electrodes and prevent decreases in the respective capacitances of the positive and negative polarizable electrodes, the volume ratio $V_-/V_+$ is preferably from 1.0 to 2.5, and more preferably from 1.3 to 2.0. If this ratio is below 1.0, the void volume of the negative polarizable electrode becomes smaller. Hence, the amount of ions present near the negative polarizable electrode decreases and the internal resistance of the negative polarizable electrode increases, as a result of which there is a large possibility that the percent retention of capacitance by the positive polarizable electrode will decrease even further. On the other hand, if the above ratio is above 2.5, the void volume of the negative polarizable electrode becomes higher and the electrode thickness increases, resulting in a strong possibility of an excessive drop in the energy density.

Polarizable Electrode

The polarizable electrodes of the inventive electric double layer capacitor are formed by a method which involves, for example, applying an activated carbon and a binder in a mixed and dispersed state onto one or both sides of a current collector.

The electrode density of the polarizable electrodes, while not subject to any particular limitation, is preferably from 0.4 to 0.6 g/cm$^3$, and more preferably from 0.45 to 0.57 g/cm$^3$. At an electrode density below 0.4 g/cm$^3$, the energy density of the capacitor tends to decrease, whereas at a density above 0.6 g/cm$^3$, there is less space for the electrolytic solution, which may render insufficient the amount of ions $Q_e$ within the electrolytic solution that is impregnated. "Electrode density" refers herein to the numerical value obtained by dividing the weight of the polarizable electrodes when dry by the apparent volume calculated from the surface area and thickness of the polarizable electrodes.

The thickness of the polarizable electrode formed on one side of the current collector is preferably from 20 to 200 μm, more preferably from 30 to 150 μm, and even more preferably from 40 to 120 μm. At less than 20 μm, there is a possibility that the energy density of the capacitor will decrease. On the other hand, at more than 200 μm, the energy density of the capacitor increases, making it necessary to either increase the separator thickness or increase the electrolyte concentration so as to keep the above-described ion content ratio $Q_e/Q_t$ within the required range, which in turn increases the possibility of an increase in the internal resistance of the capacitor.

Any current collectors employed in electric double layer capacitors may generally be selected for use as the current collectors in the positive and negative polarizable electrodes. The current collectors are preferably aluminum foil, especially aluminum foil having an etched surface. As to the negative current collector, it include, in addition to the above, copper foil, nickel foil, and metal foil on the surface of which has been formed a copper plating film or a nickel plating film.

The foils making up the respective current collectors may be in any of various suitable forms, including ordinary foil, perforated mesh foil, or foil having a three-dimensional network structure. The current collector has a thickness of generally about 10 to 200 μm. However, taking into account such properties as the electrical conductivity and strength of the current collector, the thickness is preferably 15 to 100 μm, and more preferably 20 to 70.

Any of various known binders may be used. Illustrative examples include polytetrafluoroethylene, polyvinylidene fluoride, polyamideimide, carboxymethyl cellulose, fluoroolefin copolymer crosslinked polymers, polyvinyl alcohols, polyacrylic acid and polyimides. These may be used singly or as combinations of two or more thereof. Polyvinylidene fluoride and polyamideimide are especially preferred from the standpoint of polarizable electrode coatability, bond strength to the current collector, and electrode resistance near the end of the capacitor operating life.

These binders are added in an amount, per 100 parts by weight of activated carbon, of preferably from 0.5 to 20 parts by weight, and more preferably from 1 to 10 parts by weight.

Any known activated carbon may be suitably selected without particular limitation and used as the activated carbon in the respective positive and negative polarizable electrodes. However, the activated carbon used in the negative polarizable electrode (also referred to below as "negative electrode activated carbon") is preferably one obtained by steam activation and having micropores with a pore radius distribution peak, as determined by the MP method, in a range of from $4.0 \times 10^{-10}$ to $1.0 \times 10^{-9}$ m (4.0 to 10 Å). The activated carbon used in the positive polarizable electrode (also referred to below as "positive electrode activated carbon") is preferably one obtained by alkali activation.

As used herein, "MP method" refers to the micropore method for measuring pore volume. Specifically, the thickness of the adsorption layer is computed from the relative pressure using the De Boer equation (see J. C. P. Broekhoff and J. H. De Boer: *J. Catalysis* 9 (1967), p. 15), a correlation plot (t-plot) of the adsorption layer thickness and the amount of nitrogen gas adsorption at the boiling point of –195.8° C. is prepared, the surface area for each interval is computed from the amount of change in the slope of the tangent at each point on the correlation plot, and the pore volume is determined from the amounts of change in these surface areas (see R. Sh. Mikhail, S. Brunauer and E. E. Bodor: *Journal of Colloid and Interface Science* 26 (1968), pp. 45-53).

Also, in the electric double layer capacitor of the invention, it is advantageous for the positive activated carbon to have a weight $W_+$ and for the negative activated carbon to have a weight $W_-$ such that the ratio $W_-/W_+$ therebetween is preferably from 1.1 to 2.0, more preferably from 1.2 to 1.9, and even more preferably from 1.3 to 1.8. By adjusting the weight ratio between the respective activated carbons included in the positive and negative electrodes within this range, it is possible to increase even further the durability of the electric double layer capacitor.

A conductive material may be added to the polarizable electrodes of the invention. The conductive material may be any suitable material capable of conferring electrical conductivity to the polarizable electrodes. Illustrative, non-limiting, examples include carbon black, Ketjenblack, acetylene black, carbon whiskers, carbon fibers and nanocarbon materials such as carbon nanotubes; natural graphite, artificial graphite, titanium oxide and ruthenium oxide; and fibers or fine particles of metals such as aluminum, titanium and nickel. Any one or combination of two or more thereof may be used. Of these, Ketjenblack and acetylene black, both of which are types of carbon black, are preferred.

The average particle size of the conductive material is not subject to any particular limitation, although a size of generally 10 nm to 10 μm, preferably 10 to 100 nm, and more preferably 20 to 40 nm, is desirable. It is particularly advantageous for the conductive material to have an average particle size which is from 1/5000 to 1/2, and preferably from 1/1000 to 1/10, as large as the average particle size of the activated carbon.

The amount of conductive material included is not subject to any particular limitation, although addition of the conductive material in an amount of 0.1 to 20 parts by weight, and preferably 0.5 to 10 parts by weight, per 100 parts by weight of the activated carbon is desirable from the standpoint of such considerations as the capacitance and the conductivity-imparting effects.

The method of preparing the polarizable electrode-forming composition made up of activated carbon, a binder and, if necessary, a conductive material is not subject to any particular limitation. For example, use may be made of a method in which the composition is prepared in solution form by mixing together the activated carbon, the conductive material and the binder in the presence of a solvent in which the binder is soluble.

Separator

The separator in the inventive electric double layer capacitor may be of a type that is commonly used in electric double layer capacitors. Illustrative examples include those made of glass fibers, polyolefin, polyamideimide, polyester, fluorocarbon resins, cellulose-based material or the like. Specific examples include porous films made of polyolefins such as polyethylene or polypropylene, polyamideimide, polyvinylidene fluoride or polytetrafluoroethylene; polyolefin nonwoven fabric and polyester nonwoven fabric; and glass fiber sheets, cellulose paper. Separators containing electrically insulating inorganic fine particles or an insulating inorganic filler may also be used. In case of the ratio $Q_e/Q_t$ is large, it is preferable to use the separator made of materials except cellulose.

The separator has a thickness of generally from 5 to 200 μm, preferably from 10 to 100 μm, and more preferably from 20 to 60 μm. At less than 5 μm, the leakage current may become larger, whereas at more than 200 μm, a decrease in the energy density and an increase in internal resistance may arise.

In the practice of the invention, the separator has a porosity, as calculated from the separator thickness and apparent surface area and the true density of the separator material, of preferably 60 to 95%, more preferably 70 to 92%, and even more preferably 75 to 90%. At a porosity of less than 60%, the pore volume of the separator is low and the amount of ions $Q_e$ within the electrolytic solution impregnated into the void volume may be small. At a porosity greater than 95%, the separator will tend to have a low strength and will be thin during use, as a result of which the void volume may be too small.

In the electric double layer capacitor of the invention, to maintain the amount of ions $Q_e$ within the organic electrolytic solution impregnated into the void volume and prevent the electrolytic solution from drying up, it is preferable to retain the organic electrolytic solution in a volume which is at least the volume $V_p$ of the organic electrolytic solution impregnated into the void volumes of the polarizable electrodes and the separator. This preferred amount (volume) of the electrolytic solution can be defined in terms of the ratio $V_a/V_p$ between the volume $V_p$ of electrolytic solution that impregnates into the void volumes of the polarizable electrodes and the separator and the volume $V_a$ of all the electrolytic solution. In the practice of the invention, the ratio $V_a/V_p$ is preferably from 1.0 to 1.2, and more preferably from 1.01 to 1.1. At below 1.0, there is a possibility that the electrolytic solution will dry up, whereas at above 1.2, problems such as a decrease in the charge-discharge efficiency and leaking of the electrolytic solution may arise.

Organic Electrolytic Solution

The organic electrolytic solution in the electric double layer capacitor of the invention is either composed entirely of the ionic liquid of general formula (1) below, or is composed of an electrolyte (which may be an ionic liquid) dissolved in an organic solvent.

(1)

In the formula, $R^1$ to $R^4$ are each independently an alkyl group of 1 to 5 carbons or an alkoxyalkyl group of the formula R'—O—(CH$_2$)$_n$— (R' being methyl or ethyl, and the letter n being an integer from 1 to 4) and any two of $R^1$, $R^2$, $R^3$ and $R^4$ may form a ring together with X, with the proviso that at least one of $R^1$ to $R^4$ is the alkoxyalkyl group of the above formula; X is a nitrogen atom or a phosphorus atom; and Y is a monovalent anion.

Examples of the alkyl group of 1 to 5 carbons include methyl, ethyl, propyl, 2-propyl, butyl and pentyl. Examples of alkoxyalkyl groups of the formula R'—O—(CH$_2$)$_n$— include methoxymethyl, ethoxymethyl, methoxyethyl and ethoxyethyl, methoxypropyl and ethoxypropyl, and methoxybutyl and ethoxybutyl.

Exemplary compounds in which any two groups from among $R^1$, $R^2$, $R^3$ and $R^4$ form a ring include, when X is a nitrogen atom, quaternary ammonium salts having an aziridine, azetidine, pyrrolidine or piperidine ring; and when X is a phosphorus atom, quaternary phosphonium salts having a pentamethylenephosphine (phospholinane) ring.

Preferred cations include the diethyl(2-methoxyethyl)methylammonium cation and the N-(2-methoxyethyl)-N-methylpyrrolidinium cation.

Examples of anions that may be used as the constituent anions in the ionic liquid include, but are not limited to, $BF_4^-$, $CF_3BF_3^-$, $C_2F_5BF_3^-$, $PF_6^-$, $AsF_6^-$, $SbF_6^-$, $AlCl_4^-$, $HSO_4^-$, $ClO_4^-$, $CH_3SO_3^-$, $CF_3SO_3^-$, $CF_3CO_2^-$, $(CF_3SO_2)_2N^-$, $Cl^-$, $Br^-$ and $I^-$.

Preferred examples of ionic liquids include diethyl(2-methoxyethyl)methylammonium tetrafluoroborate, N-(2-methoxyethyl)-N-methylpyrrolidinium tetrafluoroborate, diethyl(2-methoxyethyl)methylammonium trifluoromethyltrifluoroborate, N-(2-methoxyethyl)-N-methylpyrrolidinium trifluoromethyltrifluoroborate, diethyl(2-methoxyethyl)methylammonium pentafluoroethyltrifluoroborate and N-(2-methoxyethyl)-N-methylpyrrolidinium trifluoromethylpentafluoroethyltrifluoroborate. The ionic liquid may be used singly or as a mixture of two or more thereof.

The nonaqueous organic solvent is not subject to any particular limitation, provided it has the ability to dissolve the electrolyte, has a small molecular size, and is stable within the operating voltage range of the electric double layer capacitor. However, a nonaqueous organic solvent which has a large dielectric constant, a wide range of electrochemically stability and a broad service temperature range, and which also has an excellent safety is preferred.

Examples include propylene carbonate, ethylene carbonate, dimethyl carbonate, diethyl carbonate, methyl ethyl carbonate, acetonitrile, sulfolane, methylsulfolane, 2,4-dimethylsulfolane, γ-butyrolactone, tetrahydrofuran, 2-methyltetrahydrofuran, 1,3-dioxolane and 4-methyldioxalane. These solvents may be used singly or as mixtures of two or more thereof.

Of these solvents, propylene carbonate is especially preferred because it has a good ability to dissolve the electrolyte salt even at very low temperatures of −20° C. or below, an excellent electrical performance, and a relatively high flash point during use at elevated temperatures.

The organic electrolytic solution used in the inventive electric double layer capacitor may include any of various additives commonly employed in organic electrolytic solutions, such as surfactants, decomposition inhibitors, dehydrating agents, dehalogenating agents and flame retardants. The amount of these additives, while not subject to any particular limitation, is generally not more than 20 wt % of the organic electrolytic solution.

Suitable electrolytes include ionic liquids of above formula (1), other ionic liquids such as those described in JP-A 11-54375, and any of the various types of electrolytes known to be commonly used as crystalline electrolytes for electric double layer capacitors. However, if an ionic liquid is to be used, an ionic liquid of above formula (1) is preferred from the standpoint of withstand voltage, solvent solubility, and ionic conductivity.

For reasons having to do with the low-temperature properties of the capacitor, the ionic liquid of above formula (1) is preferably one having a melting point of 25° C. or below. Suitable ionic liquids of formula (1) are as noted above.

Examples of suitable crystalline electrolytes include the $BF_4$ salts, $PF_6$ salts, $ClO_4$ salts, $CF_3SO_3$ salts and $N(CF_3SO_2)_2$ salts of quaternary ammoniums such as tetraethylammonium, tetrabutylammonium and triethylmethylammonium. A salt in which the cation diameter is larger than the anion diameter is preferred.

In the practice of the invention, the electrolyte concentration of the organic electrolytic solution is preferably from 0.9 to 1.8 mol/L, more preferably 1.0 to 1.5 mol/L, and even more preferably 1.1 to 1.3 mol/L. At an electrolyte concentration outside of the range of 0.9 to 1.8 mol/L, the electrolytic solution may have a lower ionic conductivity, resulting in an increase in the direct current resistance during high-current discharge, particularly during high-current discharge at a low temperature.

Electric Double Layer Capacitor

The construction and form of the inventive electric double layer capacitor are not subject to any particular limitation, provided the capacitor has a pair of current collectors, positive and negative polarizable electrodes, a separator interposed between these electrodes, and an organic electrolytic solution impregnated within at least the positive and negative polarizable electrodes and the separator. Any of various types of known constructions may be employed, including multilayer capacitors like that shown in FIG. 1 and coin-shaped capacitors.

Figure 1:
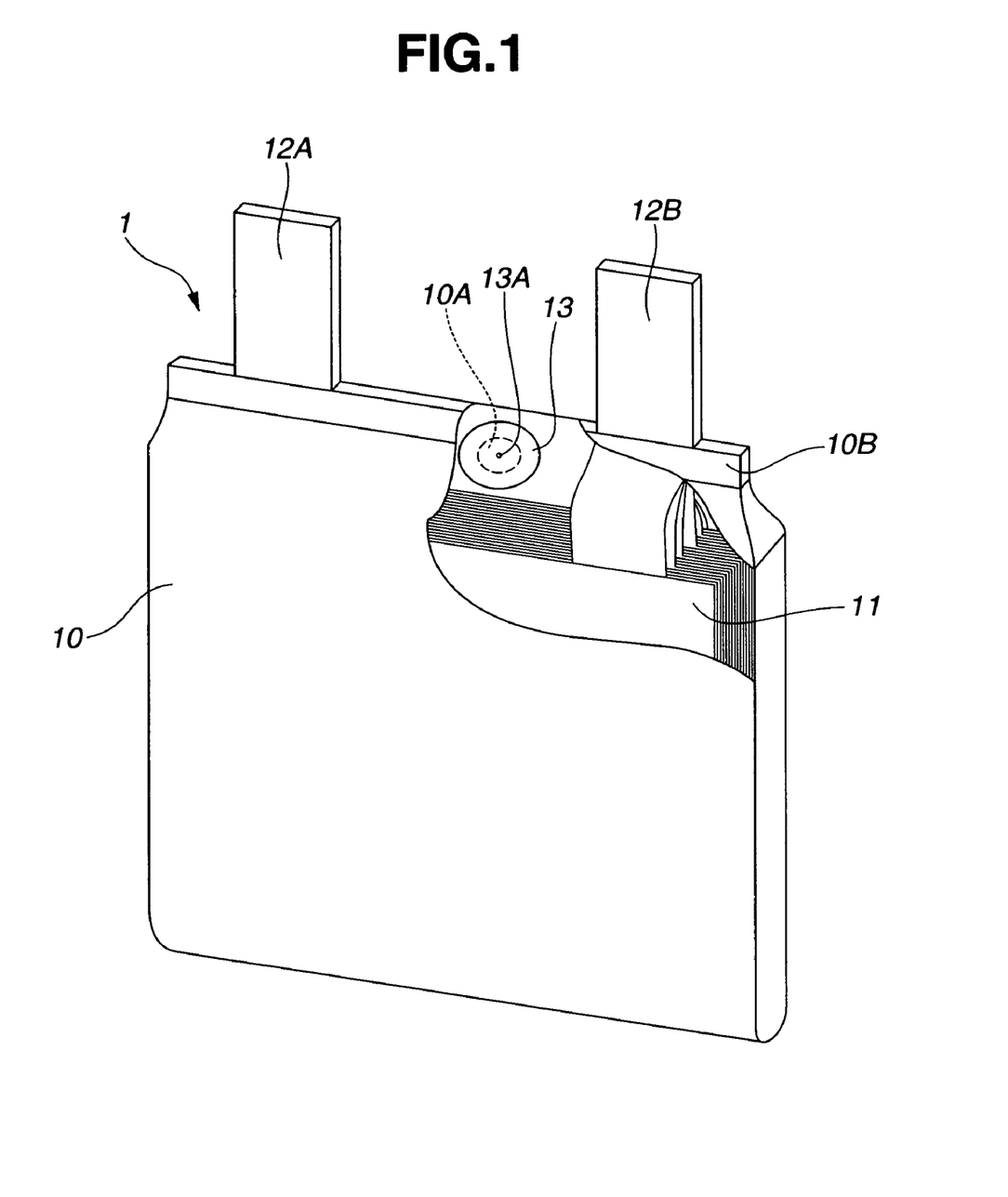
FIG. 1 is a partially cutaway perspective view of an electric double layer capacitor according to one embodiment of the invention.
Figure 2:
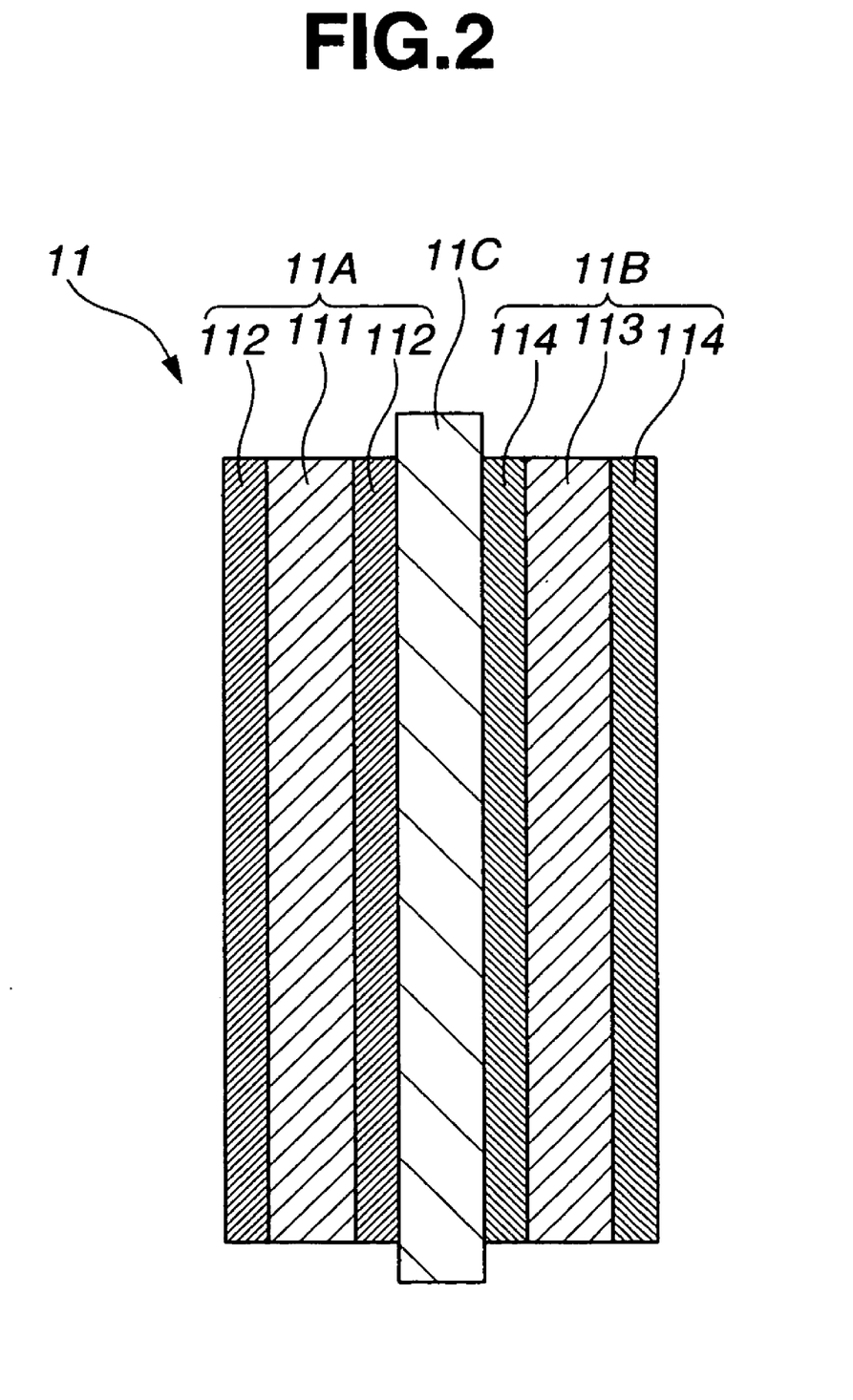
FIG. 2 is a partially enlarged sectional view showing the electrode group in the same embodiment.

An embodiment of the electric double layer capacitor of the invention is described in conjunction with the attached diagrams. Referring to FIGS. 1 and 2, an electric double layer capacitor 1 has an outer enclosure 10, an electrode group 11 housed within the outer enclosure 10, and an organic electrolytic solution (not shown) impregnated in at least the electrode group 11.

The organic electrolytic solution should impregnate at least the electrode group. For example, the organic electrolytic solution may be filled within the outer enclosure to such a degree as to immerse the electrode group.

As shown in FIG. 2, the electrode group 11 is composed of a positive polarizable electrode assembly 11A and a negative polarizable electrode assembly 11B in a multilayer stacked arrangement which includes a separator 11C disposed therebetween. The positive polarizable electrode assembly 11A is composed of positive polarizable electrodes 112 formed as layers on both sides of a positive current collector 111. The negative polarizable electrode assembly 11B is composed of negative polarizable electrodes 114 formed as layers on both sides of a negative current collector 113.

A higher number of stacked electrode assemblies enables the internal resistance to be reduced, and is thus beneficial. At the same time, the ratio of the void volume of the separator as a proportion of the void volume of the capacitor as a whole becomes larger, which is advantageous for adjusting the ratio $Q_e/Q_t$ between the theoretical amount of ions $Q_t$ and the amount of ions $Q_e$ in the electrolytic solution impregnated into the void volumes of the positive and negative polarizable electrodes and the separator. On the other hand, at a number of stacked electrode assemblies which is too high, the volume of the current collectors and the separators as a proportion of the electrode group volume increases, lowering the volume output density. Hence, an upper limit in the number of stacked assemblies should be set in accordance with the internal resistance that is desired.

The number of positive electrode assemblies and the number of negative electrode assemblies may be the same, or either may be higher than the other by one. The total number of positive and negative electrode assemblies is preferably at least 5, more preferably at least 7, and even more preferably at least 9. If both types of electrode assemblies are present in the same number, the electrode assemblies situated as the outermost layers of the electrode group consist of a positive electrode assembly on one side and a negative electrode assembly on the other side. On the other hand, if there is one more of either type of electrode assembly than of the other, the type of electrode assembly present in greater number will serve as both outermost layers.

In the electric double layer capacitor of the invention, for good durability, it is especially preferable that the electrode assemblies serving as the outermost layers have negative polarizable electrodes; i.e., that the number of negative electrode assemblies in the electrode group be at least one greater than the number of positive electrode assemblies.

The positive polarizable electrode assemblies 11A and the negative polarizable electrode assembles 11B making up the electrode group 11 have joined respectively thereto a positive terminal 12A and a negative terminal 12B which serve as current leads and extend from the interior of the outer enclosure 10 to the exterior. These terminals 12A and 12B are fixed to the outer enclosure 10 by an outer enclosure seal 10B where they emerge from the outer enclosure 10. Moreover, the positive polarizable electrode assemblies 11A are connected in parallel by the positive terminal 12A, and the negative polarizable electrode assemblies 11B are similarly connected in parallel by the negative terminal 12B. Such a construction in which the positive and negative polarizable electrode assemblies 11A and 11B are each connected in parallel is advantageous for reducing internal resistance. However, it is also acceptable to use a construction obtained by placing a separator between polarizable electrode assemblies in the form of long strips and winding the resulting arrangement of layers into a roll. Alternatively, electrode groups already stacked in small units may be connected in parallel in such a way as to achieve the desired capacitance.

Moreover, in this embodiment, a circular opening 10A which communicates between the interior and exterior of the outer enclosure 10 is formed in the outer enclosure 10 at a position located below and near to the seal 10B and between the two terminals 11A and 11B, and a substantially circular valve mechanism 13 is attached so as to cover this opening 10A from inside the outer enclosure 10.

The valve mechanism 13 is a substantially circular disc-like resin-based elastic body which has a hole 13A formed with a needle at substantially the center thereof and is attached to the outer enclosure 10 by thermal welding. The hole 13A is normally closed due to the resilience of the elastic body. However, when the internal pressure within the enclosure 10 rises, it opens, due likewise to the resilience of the elastic body, thereby releasing gases and the like which have built up at the interior of the enclosure 10.

The inventive electric double layer capacitor described above is a high-value capacitor having a cell capacitance of 100 to 10,000 F, preferably 150 to 5,000 F, and more preferably 200 to 2,000 F, and is suitable for use as a high-current storage device in applications that require a high current, such as electric cars and electrical power tools. The upper limit voltage (rated voltage) allowable for the electrical double layer capacitor of the invention may be set to 2.7 V or more, and preferably 3.0 V or more.

The inventive electric double layer capacitor can also, of course, be used as a memory backup power supply for cell phones, notebook computers and wireless terminals, as a power supply for cell phones and portable acoustic devices, as an uninterruptible power supply for personal computers and other equipment, and as various types of low-current electrical storage devices such as load leveling power supplies used in combination with solar power generation or wind power generation.

EXAMPLES

The following Examples of the invention and Comparative Examples are provided by way of illustration and not by way of limitation.

Example 1

(1) Manufacture of Positive Electrode Assembly

A coating slurry for the positive polarizable electrodes was prepared by mixing the activated carbon Maxsorb MSP20 (produced by Kansai Coke and Chemicals Co., Ltd.; BET specific surface area, 2,300 $m^2/g$; pore volume, 1.07 mL/g; 50% particle size, 9.5 μm), a conductive material (HS-100; Denki Kagaku Kogyo KK), and PVDF (Sigma-Aldrich Japan KK; weight-average molecular weight, 534,000) as the binder in a weight ratio therebetween of 85:8:7 within N-methylpyrrolidone (NMP) as the coating solvent.

The slurry was applied to both sides of an etched aluminum foil (30CB; Japan Capacitor Industrial Co., Ltd.) as the positive current collector 111, then rolled using a roll press, following which the NMP was removed by drying so as to form positive polarizable electrodes 112, thereby giving a positive polarizable electrode assembly 11A. The apparent surface area of the polarizable electrodes 112 in this electrode assembly 11A was 130 $cm^2$, the electrode density was 0.54 $g/cm^3$, and the thickness of the polarizable electrode formed on one side of the current collector was 65 μm.

The BET specific surface area and the pore volume were values computed by the nitrogen gas adsorption method, and the 50% particle size was a value measured using the Microtrack HRA, a laser diffraction type particle size analyzer manufactured by Nikkiso Co., Ltd.

(2) Manufacture of Negative Electrode Assembly

A coating slurry for the negative polarizable electrodes was prepared by mixing the activated carbon LPY039 (produced by Japan EnviroChemicals, Ltd.; peak pore radius by MP method, $4.1 \times 10^{10}$ m; specific surface area, 1,900 $m^2/g$; pore volume, 0.90 mL/g; 50% particle size, 10.3 μm), a conductive material (HS-100; Denki Kagaku Kogyo KK), and PVDF (Sigma-Aldrich Japan KK; weight-average molecular weight, 534,000) as the binder in a weight ratio therebetween of 85:7:8 within N-methylpyrrolidone (NMP) as the coating solvent.

The slurry was applied to both sides of an etched aluminum foil (30CB; Japan Capacitor Industrial Co., Ltd.) as the negative current collector 113, then rolled using a roll press, following which the NMP was removed by drying so as to form negative polarizable electrodes 114, thereby giving a negative polarizable electrode assembly 11B. The apparent surface area of the polarizable electrodes 114 in this electrode assembly 11B was 130 $cm^2$, the electrode density was 0.50 $g/cm^3$, and the thickness of the polarizable electrode formed on one side of the current collector was 75 μm.

The peak pore radius was a value calculated by the MP method based on the above BET measurement results.

(3) Manufacture of Electric Double Layer Capacitor

Nine positive polarizable electrode assemblies 11A and ten negative polarizable electrode assemblies 11B were alternately stacked with separators 11C (NI040A, produced by Nippon Sheet Glass Co., Ltd.; porosity, 79.0%; thickness, 40 μm) placed therebetween (total number of separators, including outermost layers: 20). The positive and negative electrode assemblies were then collectively welded to aluminum terminals 12A and 12B, respectively, thereby giving an electrode group 11.

The resulting electrode group 11 was inserted into an outer enclosure 10 made of an aluminum laminate (produced by Dai Nippon Printing Co., Ltd.; 25-μm outer layer of 6-nylon, 40-μm gas barrier layer of soft aluminum, 30+15-μm inner layer of polypropylene+modified polypropylene) and having a valve 13. Next, 38 mL of an organic electrolytic solution was added to the enclosure 10 and impregnated into the electrolyte group 11, following which the outer enclosure 10 was thermally sealed at the seal 10B, thereby giving the electrical double layer capacitor 1 shown in FIG. 1. The organic electrolytic solution used here was prepared by dissolving diethyl(2-methoxyethyl)methylammonium tetrafluoroborate (an ionic liquid; abbreviated below as $DEME-BF_4$) as the electrolyte to a concentration of 1.3 mol/L in propylene carbonate (PC) as the solvent. Impregnation of the electrolytic solution was carried out under 12 or more hours of standing at 25° C. and a reduced pressure of 10 kPa.

Example 2

Aside from setting the thickness of the negative polarizable electrode formed on one side of the current collector to 85 µm and changing the amount the organic electrolytic solution added to 39 mL, an electric double layer capacitor was obtained in the same way as in Example 1.

Example 3

Aside from setting the thickness of the negative polarizable electrode formed on each side of the current collector to 90 µm and changing the amount of the organic electrolytic solution added to 41 mL, an electric double layer capacitor was obtained in the same way as in Example 1.

Example 4

Aside from setting the thickness of the negative polarizable electrode formed on one side of the current collector to 100 µm and changing the amount of the organic electrolytic solution added to 42 mL, an electric double layer capacitor was obtained in the same way as in Example 1.

Example 5

Aside from setting the thickness of the positive polarizable electrode formed on one side of the current collector to 60 µm, setting the thickness of the negative polarizable electrode formed on one side of the current collector to 105 µm, and changing the amount of the organic electrolytic solution added to 43 mL, an electric double layer capacitor was obtained in the same way as in Example 1.

Example 6

Aside from setting the thickness of the negative polarizable electrode formed on one side of the current collector to 110 µm, and changing the amount of the organic electrolytic solution added to 44 mL, an electric double layer capacitor was obtained in the same way as in Example 5.

Example 7

Aside from setting the thickness of the negative polarizable electrode formed on one side of the current collector to 113 µm, an electric double layer capacitor was obtained in the same way as in Example 5.

Example 8

Aside from using the activated carbon RP25 (Kuraray Coal, produced by Kuraray Chemical Co., Ltd.; peak pore radius by MP method, $4.7 \times 10^{-10}$ m; BET specific surface area, 2,500 m$^2$/g; pore volume, 1.30 mL/g; 50% particle size, 7.5 µm) as the activated carbon in the negative polarizable electrodes, setting the thickness of the negative polarizable electrode formed on one side of the current collector to 80 µm, and adding 40 mL of a PC solution having a DEME-BF$_4$ concentration of 1.1 mol/L, an electric double layer capacitor was obtained in the same way as in Example 5. The electrode density in the negative polarizable electrode was 0.52 g/cm$^3$.

Example 9

Aside from using the activated carbon YP20 (Kuraray Coal, produced by Kuraray Chemical Co., Ltd.; peak pore radius by MP method, $4.3 \times 10^{-10}$ m; BET specific surface area, 2,100 m$^2$/g; pore volume, 1.06 mL/g; 50% particle size, 5.5 µm) as the activated carbon in the negative polarizable electrodes, setting the thickness of the negative polarizable electrode formed on one side of the current collector to 100 µm, and adding 45 mL of a PC solution having a DEME-BF$_4$ concentration of 1.1 mol/L, an electric double layer capacitor was obtained in the same way as in Example 1. The electrode density in the negative polarizable electrode was 0.50 g/cm$^3$.

Example 10

Aside from using the activated carbon YP20 as the activated carbon in the positive and negative polarizable electrodes, setting the thickness of the positive polarizable electrode formed on one side of the current collector to 70 µm, setting the thickness of the negative polarizable electrode formed on one side of the current collector to 85 µm, and adding 44 mL of a PC solution having a DEME-BF$_4$ concentration of 1.1 mol/L, an electric double layer capacitor was obtained in the same way as in Example 1. The electrode densities in the negative and positive polarizable electrodes were both 0.50 g/cm$^3$.

Example 11

Aside from using polyamideimide (Vylomax, produced by Toyobo Co., Ltd.; solids concentration, 20%; solvent, NMP; solution viscosity, 46.5 dPa·s) as the binder in the positive and negative polarizable electrodes, using a polyester nonwoven fabric (porosity, 62.0%; thickness, 35 µm) as the separator, using a PC solution having an N-(2-methoxethyl)-N-methylpyrrolidinium tetrafluoroborate (ionic liquid, PROME-BF$_4$) concentration of 0.9 mol/L as the organic electrolytic solution, and adding 43 mL of this electrolytic solution, an electric double layer capacitor was obtained in the same way as in Example 4.

Example 12

Aside from using the separator NI040A and using a PC solution having a PROME-BF$_4$ concentration of 1.5 mol/L as the organic electrolytic solution, an electric double layer capacitor was obtained in the same way as in Example 11.

Example 13

Aside from setting the thickness of the positive polarizable electrode formed on one side of the current collector to 110 µm, setting the thickness of the negative polarizable electrode formed on one side of the current collector to 170 µm, alternately stacking five positive electrode assemblies and six negative electrode assemblies with the separator NI040A placed therebetween (total number of separators, including outermost layers: 12), and adding 38 mL of a PC solution having a DEME-BF$_4$ concentration of 1.1 mol/L, an electric double layer capacitor was obtained in the same way as in Example 1. The electrode density was 0.54 g/cm$^3$ in the positive polarizable electrodes and 0.50 g/cm$^3$ in the negative polarizable electrodes.

Example 14

Aside from using a PC solution having a DEME-BF$_4$ concentration of 1.1 mol/L as the organic electrolytic solution, an electric double layer capacitor was obtained in the same way as in Example 4.

Example 15

Aside from setting the thickness of the positive polarizable electrode formed on one side of the current collector to 45 μm, setting the thickness of the negative polarizable electrode formed on one side of the current collector to 70 μm, alternately stacking 13 positive electrode assemblies and 14 negative electrode assemblies with the separator NI040A placed therebetween (total number of separators, including outermost layers: 28), and adding 47 mL of a PC solution having a DEME-BF$_4$ concentration of 1.1 mol/L as the organic electrolytic solution, an electric double layer capacitor was obtained in the same way as in Example 1. The electrode density was 0.54 g/cm$^3$ in the positive polarizable electrodes and 0.50 g/cm$^3$ in the negative polarizable electrodes.

Example 16

Aside from alternately stacking the positive and negative electrode assemblies with two layers of the separator NI040A interposed between adjoining electrode assemblies, using a PC solution having a tetraethylammonium tetrafluoroborate (TEA-BF$_4$) concentration of 1.2 mol/L as the organic electrolytic solution and adding 52 mL of this electrolytic solution, an electric double layer capacitor was obtained in the same way as in Example 4.

Example 17

Aside from using a polyamideimide porous film (porosity, 65.0%; thickness, 40 μm) as the separator, using a PC solution having a TEA-BF$_4$ concentration of 1.2 mol/L as the organic electrolytic solution, and adding 41 mL of this electrolytic solution, an electric double layer capacitor was obtained in the same way as in Example 4.

Example 18

Aside from alternately stacking 17 positive electrode assemblies and 18 negative electrode assemblies with the separator NI040A interposed therebetween (total number of separators, including outermost layers: 36), using a PC solution having a PROME-BF$_4$ concentration of 1.1 mol/L as the organic electrolytic solution, and adding 78 mL of this electrolytic solution, an electric double layer capacitor was obtained in the same way as in Example 4.

Example 19

Aside from setting the apparent surface area of the polarizable electrodes to 33 cm$^2$ and changing the amount of the organic electrolytic solution added to 20 mL, an electric double layer capacitor was obtained in the same way as in Example 18.

Comparative Example 1

Aside from using an organic electrolyte solution having a DEME-BF$_4$ concentration of 0.7 mol/L, and adding 43 mL of this electrolytic solution, an electric double layer capacitor was obtained in the same way as in Example 4.

Comparative Example 2

Aside from alternately stacking the electrode assemblies with polyamideimide porous film (porosity, 65.0%; thickness, 40 μm) placed therebetween as the separators, using an organic electrolyte solution having a DEME-BF$_4$ concentration of 1.7 mol/L, and adding 43 mL of this electrolytic solution, an electric double layer capacitor was obtained in the same way as in Example 4.

Comparative Example 3

Aside from alternately stacking the electrode assemblies with polyester nonwoven fabric (porosity, 55.0%; thickness, 40 μm) placed therebetween as the separators, using an organic electrolyte solution having a DEME-BF$_4$ concentration of 0.7 mol/L, and adding 41 mL of this electrolytic solution, an electric double layer capacitor was obtained in the same way as in Example 4.

Structural characteristics of the electric double layer capacitors obtained in the respective examples of the invention and the comparative examples are summarized in Table 1 below.

In Table 1, the void volume $V_s$ of the separator and the void volumes $V_+$ and $V_-$ of the positive and negative polarizable electrodes were determined from the weight of the impregnated electrolytic solution and the specific gravity of the electrolytic solution when the electrolytic solution was thoroughly impregnated into the same separators and the same positive and negative polarizable electrodes as those used in the respective examples of the invention and comparative examples and under the same conditions as during manufacture of the electric double layer capacitors. The porosity of the separator was determined from the apparent volume and void volume $V_s$ of the separator. The total void volume $V_p$ of the capacitor was the sum of the respective void volumes of the separator and the positive and negative polarizable electrodes ($V_s+V_++V_-$).

TABLE 1

| | | Positive polarizable electrode | | Negative polarizable electrode | | Separator | | Organic electrolytic solution | |
|---|---|---|---|---|---|---|---|---|---|
| | | Activated carbon weight $W_+$ (g) | Void volume $V_+$ (mL) | Activated carbon weight $W_-$ (g) | Void volume $V_-$ (mL) | Porosity (%) | Void volume $V_S$ (mL) | Electrolyte concentration (mol/L) | Total electrolytic solution volume $V_a$ (mL) |
| Example | 1 | 6.90 | 11.30 | 8.27 | 14.95 | 79.0 | 9.92 | 1.3 | 38.0 |
| | 2 | 6.90 | 11.30 | 9.38 | 16.94 | 79.0 | 9.92 | 1.3 | 39.0 |
| | 3 | 6.90 | 11.30 | 9.93 | 17.94 | 79.0 | 9.92 | 1.3 | 41.0 |
| | 4 | 6.90 | 11.30 | 11.03 | 19.93 | 79.0 | 9.92 | 1.3 | 42.0 |
| | 5 | 6.37 | 10.43 | 11.58 | 20.93 | 79.0 | 9.92 | 1.3 | 43.0 |

TABLE 1-continued

|  |  |  |  |  |  |  |  |  |
|---|---|---|---|---|---|---|---|---|
|  | 6 | 6.37 | 10.43 | 12.13 | 21.93 | 79.0 | 9.92 | 1.3 | 44.0 |
|  | 7 | 6.37 | 10.43 | 12.41 | 22.43 | 79.0 | 9.92 | 1.3 | 44.0 |
|  | 8 | 6.37 | 10.43 | 8.83 | 15.95 | 79.0 | 9.92 | 1.1 | 40.0 |
|  | 9 | 6.90 | 11.30 | 11.03 | 19.93 | 79.0 | 9.92 | 1.1 | 45.0 |
|  | 10 | 6.88 | 12.57 | 9.38 | 16.94 | 79.0 | 9.92 | 1.1 | 44.0 |
|  | 11 | 6.90 | 11.30 | 11.03 | 19.93 | 62.0 | 9.92 | 0.9 | 43.0 |
|  | 12 | 6.90 | 11.30 | 11.03 | 19.93 | 79.0 | 9.92 | 1.5 | 43.0 |
|  | 13 | 6.48 | 10.62 | 11.25 | 20.33 | 79.0 | 5.95 | 1.1 | 38.0 |
|  | 14 | 6.90 | 11.30 | 11.03 | 19.93 | 79.0 | 9.92 | 1.1 | 42.0 |
|  | 15 | 6.90 | 11.30 | 10.81 | 19.54 | 79.0 | 13.89 | 1.1 | 47.0 |
|  | 16 | 6.90 | 11.30 | 11.03 | 19.93 | 79.0 | 19.84 | 1.2 | 52.0 |
|  | 17 | 6.90 | 11.30 | 11.03 | 19.93 | 65.0 | 8.23 | 1.2 | 41.0 |
|  | 18 | 13.03 | 21.34 | 19.86 | 35.88 | 79.0 | 17.86 | 1.1 | 78.0 |
|  | 19 | 3.28 | 5.37 | 4.99 | 9.02 | 79.0 | 4.94 | 1.1 | 20.0 |
| Comparative | 1 | 6.90 | 11.30 | 11.03 | 19.93 | 79.0 | 9.92 | 0.7 | 43.0 |
| Example | 2 | 6.90 | 11.30 | 11.03 | 19.93 | 65.0 | 8.23 | 1.7 | 43.0 |
|  | 3 | 7.01 | 11.49 | 11.47 | 20.73 | 55.0 | 7.02 | 0.7 | 41.0 |

| | | Capacitor | | | | | | | |
|---|---|---|---|---|---|---|---|---|---|
| | | Total void volume $V_p$ (mL) | Rated capacitance C (F.) | Theoretical amount of ions $Q_t$ (mol) | Total ions in voids $Q_o$ (mol) | $Q_o/Q_t$ | $W_-/W_+$ | $V_-/V_+$ | $(V_+ + V_-)/V_s$ | $V_a/V_p$ |
| Example | 1 | 36.2 | 482 | 0.0150 | 0.0470 | 3.14 | 1.20 | 1.32 | 2.65 | 1.05 |
|  | 2 | 38.2 | 520 | 0.0162 | 0.0496 | 3.07 | 1.36 | 1.50 | 2.85 | 1.02 |
|  | 3 | 39.2 | 537 | 0.0167 | 0.0509 | 3.05 | 1.44 | 1.59 | 2.95 | 1.05 |
|  | 4 | 41.2 | 570 | 0.0177 | 0.0535 | 3.02 | 1.60 | 1.76 | 3.15 | 1.02 |
|  | 5 | 41.3 | 564 | 0.0175 | 0.0537 | 3.06 | 1.82 | 2.01 | 3.16 | 1.04 |
|  | 6 | 42.3 | 578 | 0.0180 | 0.0550 | 3.06 | 1.91 | 2.10 | 3.26 | 1.04 |
|  | 7 | 42.8 | 584 | 0.0182 | 0.0556 | 3.06 | 1.95 | 2.15 | 3.31 | 1.03 |
|  | 8 | 36.3 | 531 | 0.0165 | 0.0399 | 2.42 | 1.39 | 1.53 | 2.66 | 1.10 |
|  | 9 | 41.2 | 574 | 0.0178 | 0.0453 | 2.54 | 1.60 | 1.76 | 3.15 | 1.09 |
|  | 10 | 39.4 | 440 | 0.0137 | 0.0434 | 3.17 | 1.36 | 1.35 | 2.98 | 1.12 |
|  | 11 | 38.12 | 570 | 0.0177 | 0.0327 | 1.84 | 1.60 | 1.76 | 4.54 | 1.05 |
|  | 12 | 41.2 | 570 | 0.0177 | 0.0617 | 3.48 | 1.60 | 1.76 | 3.15 | 1.04 |
|  | 13 | 36.9 | 537 | 0.0167 | 0.0406 | 2.43 | 1.74 | 1.91 | 5.20 | 1.03 |
|  | 14 | 41.2 | 570 | 0.0177 | 0.0453 | 2.55 | 1.60 | 1.76 | 3.15 | 1.02 |
|  | 15 | 44.7 | 574 | 0.0178 | 0.0492 | 2.76 | 1.57 | 1.73 | 2.22 | 1.05 |
|  | 16 | 51.1 | 570 | 0.0177 | 0.0613 | 3.46 | 1.60 | 1.76 | 1.57 | 1.02 |
|  | 17 | 39.5 | 570 | 0.0177 | 0.0474 | 2.67 | 1.60 | 1.76 | 3.80 | 1.04 |
|  | 18 | 75.1 | 1077 | 0.0335 | 0.0828 | 2.47 | 1.52 | 1.68 | 3.20 | 1.04 |
|  | 19 | 19.3 | 271 | 0.0084 | 0.0213 | 2.53 | 1.52 | 1.68 | 2.91 | 1.03 |
| Comparative | 1 | 41.2 | 570 | 0.0177 | 0.0288 | 1.63 | 1.60 | 1.76 | 3.15 | 1.04 |
| Example | 2 | 39.5 | 570 | 0.0177 | 0.0671 | 3.78 | 1.60 | 1.76 | 3.80 | 1.09 |
|  | 3 | 39.2 | 578 | 0.0180 | 0.0275 | 1.53 | 1.64 | 1.80 | 4.59 | 1.04 |

Note:
The rated voltage of the capacitors was 3 V.

The following tests were performed on each of the capacitors obtained in the respective above examples of the invention and comparative examples. The results are shown in Table 2.

Initial Characteristics

The capacitance and internal resistance (25° C., −30° C.) following manufacture were measured.

The capacitance was calculated from the total amount of energy discharged when, after being constant-current charged to 3.0 V at the one-hour rate current and constant-voltage charged thereafter for 30 minutes, the capacitor was constant-current discharged from 3.0 V to 0 V at the one-hour rate current.

To obtain the internal resistance, the capacitor was constant-current charged at the one-hour rate current to 3.0 V and constant-voltage charged thereafter for 30 minutes, then constant-current discharged from 3.0 V at the 1/30 hour rate current. The direct-current resistance was determined from the point of intersection by the approximately straight line portion of the resulting discharge curve in the interval from 5 to 10 seconds after discharge with the Y axis at 0 seconds.

The internal resistance at low temperature was similarly measured after holding the capacitor in a thermostatic chamber at −30° C. for 6 hours.

Endurance Test

The capacitor was subjected to 1,000 hours of constant-voltage charging at a voltage setting of 3.0 V in a thermostatic chamber at 70° C. The capacitance and internal resistance (25° C.) following the endurance test were measured by the same methods as described above, and the results compared with the initial values.

High-Current Cycling Test

The capacitors obtained in Examples 4, 11, 12, 14, 16 and 17 of the invention and Comparative Examples 1 to 3 were subjected to another endurance test: a high-current cycling test of 10,000 cycles in a 25° C. environment, and at a minimum voltage of 1.5 V, a maximum voltage of 3.0 V, a charge-discharge current of 40 A, constant voltage, and no resting. The capacitances obtained before and after this endurance test were compared.

During measurement of the capacitance and the internal resistance, and during the endurance test, a stress of 0.1 MPa was applied to the capacitor in the stacking direction.

TABLE 2

| | | Initial characteristics | | | After 1,000 hours of continuous charging | | | After charge-discharge cycling at 40 A | |
|---|---|---|---|---|---|---|---|---|---|
| | | Capacitance (F.) | Internal resistance at 25° C. (mΩ) | Internal resistance at −30° C. (mΩ) | Capacitance (F.) | Retention of capacitance (%) | Internal resistance at 25° C. (mΩ) | Change in internal resistance (as a multiple of initial value) | Capacitance (F.) | Retention of capacitance (%) |
| Example | 1 | 480 | 2.35 | 19.5 | 385 | 80.2 | 10.7 | 4.5 | — | — |
| | 2 | 520 | 2.41 | 20.0 | 425 | 81.7 | 10.8 | 4.5 | — | — |
| | 3 | 535 | 2.43 | 20.2 | 455 | 85.0 | 9.3 | 3.8 | — | — |
| | 4 | 570 | 2.48 | 20.6 | 495 | 86.8 | 8.0 | 3.2 | 460 | 80.7 |
| | 5 | 565 | 2.48 | 20.6 | 485 | 85.8 | 8.7 | 3.5 | — | — |
| | 6 | 580 | 2.51 | 20.8 | 480 | 82.8 | 10.5 | 4.2 | — | — |
| | 7 | 585 | 2.52 | 20.9 | 465 | 79.5 | 11.3 | 4.5 | — | — |
| | 8 | 530 | 2.49 | 19.1 | 460 | 86.8 | 8.0 | 3.2 | — | — |
| | 9 | 575 | 2.63 | 20.2 | 490 | 85.2 | 10.5 | 4.0 | — | — |
| | 10 | 440 | 2.58 | 19.8 | 375 | 85.2 | 10.6 | 4.1 | — | — |
| | 11 | 570 | 2.71 | 19.0 | 505 | 88.6 | 7.0 | 2.6 | 425 | 74.6 |
| | 12 | 580 | 3.10 | 36.6 | 465 | 80.2 | 8.7 | 2.8 | 465 | 80.2 |
| | 13 | 535 | 5.75 | 44.2 | 430 | 80.4 | 40.5 | 7.0 | — | — |
| | 14 | 570 | 2.63 | 20.2 | 485 | 85.1 | 11.1 | 4.2 | 450 | 78.9 |
| | 15 | 575 | 1.67 | 12.9 | 500 | 87.0 | 4.4 | 2.6 | — | — |
| | 16 | 570 | 3.93 | 30.4 | 450 | 78.9 | 18.1 | 4.6 | 485 | 85.1 |
| | 17 | 570 | 2.54 | 19.6 | 455 | 79.8 | 10.8 | 4.3 | 445 | 78.1 |
| | 18 | 1080 | 1.46 | 11.2 | 945 | 87.5 | 3.5 | 2.4 | — | — |
| | 19 | 270 | 5.16 | 39.6 | 230 | 85.2 | 12.4 | 2.4 | — | — |
| Comparative Example | 1 | 570 | 4.21 | 25.5 | — | — | — | — | 255 | 44.7 |
| | 2 | 570 | 4.21 | 84.2 | — | — | — | — | 475 | 83.3 |
| | 3 | 580 | 5.91 | 35.8 | — | — | — | — | 245 | 42.2 |

As is apparent from Table 2, the electric double layer capacitors obtained in the respective examples of the invention had a low initial internal resistance and small increases in internal resistance at low temperature. Also, from the results of the 40 A cyclic charge-discharge tests obtained in Examples 4, 11, 12, 14, 17 and 18, the percent retention of capacitance after high-current charging and discharging was high and the cyclic characteristics were excellent.

Moreover, the electric double layer capacitors obtained in the respective examples of the invention had a high percent retention of capacitance after continuous charging, a low degree of rise in internal resistance, and excellent durability even when continuously charged under a high voltage of 3.0 V.

Japanese Patent Application No. 2005-277475 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An electric double layer capacitor having a rated capacitance (farads), comprising:
   a pair of current collectors,
   a positive polarizable electrode provided on one of the pair of current collectors,
   a negative polarizable electrode provided on the other of the pair of current collectors,
   a separator interposed between the positive and negative polarizable electrodes, and
   an organic electrolytic solution which impregnates at least the positive and negative polarizable electrodes and the separator;
   which capacitor has a theoretical amount of ions $Q_t$ defined by formula (I) below $$Q_t \text{ (moles)} = C \times V \div 96{,}500 \qquad (I),$$

wherein C is the rated capacitance (farads) of the capacitor and V is the rated voltage (volts) representing the maximum voltage allowed across the capacitor, and an amount of ions $Q_e$ in the organic electrolytic solution which impregnates the positive and negative polarizable electrodes and the separator, such that the ratio $Q_e/Q_t$ is from 1.7 to 3.5.

2. The electric double layer capacitor of claim 1, wherein the positive polarizable electrode has a void volume $V_+$ and the negative polarizable electrode has a void volume $V_-$, such that the ratio $V_-/V_+$ is from 1.0 to 2.5.

3. The electric double layer capacitor of claim 1, wherein the positive polarizable electrode has a void volume $V_+$, the negative polarizable electrode has a void volume $V_-$, and the separator has a void volume $V_s$, such that the ratio $(V_+ + V_-)/V_s$ is from 2.0 to 4.0.

4. The electric double layer capacitor of claim 1, wherein the volume $V_p$ of the electrolytic solution which impregnates the void volumes of the positive and negative polarizable electrodes and the separator, and the total volume $V_a$ of the electrolytic solution present in the capacitor together satisfy the condition that $V_a/V_p$ is from 1.0 to 1.2.

5. The electric double layer capacitor of claim 1, wherein the organic electrolytic solution contains 0.9 to 1.8 mol/L of electrolyte.

6. The electric double layer capacitor of claim 1, wherein the organic electrolytic solution includes at least an ionic liquid of formula (1) below (1)

wherein $R^1$ to $R^4$ are each independently an alkyl group of 1 to 5 carbons or an alkoxyalkyl group of the formula R'—O—$(CH_2)_n$— (R' being methyl or ethyl, and the letter n being an integer from 1 to 4) and any two of $R^1$, $R^2$, $R^3$ and $R^4$ may form a ring together with X, with the proviso that at least one of $R^1$ to $R^4$ is the alkoxyalkyl group of the above formula; X is a nitrogen atom or a phosphorus atom; and Y is a monovalent anion.

7. The electric double layer capacitor of claim 1, wherein the separator is composed of glass fibers, polyolefin, polyamideimide or polyester, and has a porosity of 60 to 95%.

* * * * *